(12) United States Patent
Sheem et al.

(10) Patent No.: US 6,355,377 B1
(45) Date of Patent: Mar. 12, 2002

(54) NEGATIVE ACTIVE MATERIAL FOR RECHARGEABLE LITHIUM BATTERY AND METHOD OF PREPARING SAME

(75) Inventors: Kyou-Yoon Sheem; Sang-Young Yoon; Wan-Uk Choi; Jae-Yul Ryu; Sang-Jin Kim, all of Cheonan-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 0 days.

(21) Appl. No.: 09/668,775

(22) Filed: Sep. 22, 2000

(30) Foreign Application Priority Data

Mar. 7, 2000 (KR) ........................................ 2000-11344

(51) Int. Cl.7 ............................................. H01M 10/24
(52) U.S. Cl. ................................ 429/231.8; 429/231.95
(58) Field of Search ........................ 252/502; 423/414; 429/231.95, 218.1, 231.8

(56) References Cited

U.S. PATENT DOCUMENTS

| | | | | |
|---|---|---|---|---|
| 4,770,825 A | * | 9/1988 | Sara | 264/29.1 |
| 5,932,373 A | * | 8/1999 | Nagamine et al. | 429/218.1 |
| 6,030,726 A | * | 2/2000 | Takeuchi et al. | 429/231.8 |
| 6,040,092 A | * | 3/2000 | Yamda et al. | 429/331 |
| 6,103,423 A | * | 8/2000 | Itoh et al. | 429/231.8 |
| 6,156,432 A | * | 12/2000 | Mabuchi et al. | 428/408 |
| 6,156,457 A | * | 12/2000 | Takami et al. | 429/231.4 |

FOREIGN PATENT DOCUMENTS

| | | | |
|---|---|---|---|
| JP | Hei 1-303727 | 11/1989 | |
| JP | Hei 2-38343 | 2/1990 | |
| JP | 3-165453 | 7/1991 | |
| JP | 3-245458 | 11/1991 | |
| JP | 04061666 | 3/1992 | ............ H01M/4/02 |
| JP | 5-266880 | 10/1993 | |
| JP | 07232071 | 8/1995 | ............ H01M/4/58 |
| JP | 07232072 | 8/1995 | ............ H01M/4/58 |
| JP | 9-63584 | 3/1997 | |
| JP | 9-63585 | 3/1997 | |

\* cited by examiner

Primary Examiner—Stephen Kalafut
Assistant Examiner—M. Wills (57) ABSTRACT

A negative active material for a rechargeable lithium battery which exhibits good high-rate charge characteristics and cycle life characteristics. The active material includes a crystalline carbon core and a semi-crystalline carbon shell. The semi-crystalline carbon shell includes at least one element or a compound of at least two different types of elements and carbides thereof, and has a turbostratic or half onion-sheath. The compound includes only element. The element serves a graphitization catalyst and causes a change in a structure of surrounding carbon. In particular, the negative active material includes metal boride and metal carbide.

14 Claims, 3 Drawing Sheets

NEGATIVE ACTIVE MATERIAL FOR RECHARGEABLE LITHIUM BATTERY AND METHOD OF PREPARING SAME

CROSS REFERENCE TO RELATED APPLICATION

This application is based on application No. 2000-11344 filed in the Korean Industrial Property Office on Mar. 7, 2000, the content of which is incorporated hereinto by reference.

BACKGROUND OF THE INVENTION (a) Field of the Invention

The present invention relates to a negative active material for a rechargeable lithium battery and a method of preparing the same and, more particularly, to a negative active material and a method of preparing the same in which the negative active material exhibits good electrochemical performance.

(b) Description of the Related Art

Metallic lithium was initially used as the negative active material in rechargeable lithium batteries. However, metallic lithium causes an abrupt loss in capacity and deposits to form a dendric layer which induces a short circuit between the negative and positive active materials and a reduction in the cycle life of the battery. There have been attempts to use lithium alloy instead of metallic lithium. However, problems encountered with the use metallic lithium nevertheless remain and are not substantially minimized.

Recently, carbonaceous material into or from which lithium ions are intercalated or deintercalated is used as the negative active material. There are two main types of carbon-based materials used crystalline graphite and amorphous carbon. Crystalline graphite includes artificial graphite and natural graphite. Typical examples of artificial graphite include mesocarbon fiber (MCF) and mesocarbonmicro beads (MCMB). There has been introduced somewhat recently artificial graphite, which is doped with a different element from carbon to produce an inexpensive negative active material exhibiting good electrochemical performance.

Mesophasecarbon microbeads and mesophase fiber are easily produced but are expensive. Also, because of a stabilizing step that must be performed, mesophasecarbon microbeads and mesophase fiber have substantially lower discharge capacities than natural graphite. Natural graphite on the other hand, has a high discharge capacity, but a higher irreversible capacity than mesophasecarbon microbeads or mesophase fiber. Also, because natural graphite is plate-shaped, discharge properties are extremely deteriorated.

To overcome such problems, various studies have been conducted on shapeless and low coke-based artificial graphite in which elements such as boron are used as a doping material to enhance the overall performance of the battery.

Japanese Patent Laid-open No. Hei 3-165453 (Central Devices Co.) discloses a method in which a BCN(H) type negative active material is produced using a CVD (Chemical Vapor Deposition) procedure.

Japanese Patent Laid-open No. Hei 3-245458 (Sony) discloses a method in which organic materials are carbonized by adding 0.15 to 2.5wt % of B compounds using an autoclave procedure to prepare a negative active material.

Japanese Patent Laid-open No. Hei 5-266880 (Matsushita) discloses a method in which B, $B_2O_3$ or $H_3BO_3$ is added to petroleum pitch and the mixture is heat-treated at 2000° C. for 20 hours to prepare a negative active material.

Japanese Patent Laid-open No. Hei 9-63584 (Petoca) and Hei 9-63585 (Petoca) disclose methods in which, after pulverizing mesophase fiber, B compounds are added to the fiber and the mixture is heat-treated.

However, in all of the above methods, a negative active material results that is deficient in at least one important aspect including capacity, charge and discharge efficiency, current density, and cycle life.

SUMMARY OF THE INVENTION

It is an object of the present invention to provide a negative active material for a rechargeable lithium battery, which exhibits good high-rate characteristics and cycle life characteristics.

It is another object to provide a method of preparing the negative active material for a rechargeable lithium battery.

These and other objects may be achieved by a negative active material for a rechargeable lithium battery including a crystalline carbon core and a semi-crystalline carbon shell formed surrounding the core. The semi-crystalline carbon shell includes at least one element and carbides thereof or a compound of at least two different types of elements, and has a turbostratic or half onion-sheath structure. The element (hereinafter referred to as a catalyst element) serves graphitization catalyst and causes a change in a structure of surrounding carbon. The compound includes only catalyst elements selected from transition metals, alkaline metals, alkaline earth metals, semi-metals of Group 3A of the Periodic table, semi-metals of Group 3B, semi-metals of Group 4A, semi-metals of Group 4B, elements of Group 5A, elements of Group 5A, lanthanides or actiniums.

The negative active material may include metal boride and metal carbide.

In order to achieve these objects and others, the present invention provides a method of preparing a negative active material for a rechargeable lithium battery. In this method, amorphous carbon or crystalline carbon is mixed with at least one catalyst element and carbides thereof, or compound of at least two different types of elements. The compound of the elements includes an A-B compound and an A-C compound. A and B are respectively at least one catalyst element and C is not a catalyst element. Thus, the A-B compound refers to a compound including only catalyst elements and the A-C compound refers to a compound including another component in addition to the catalyst elements. The catalyst element acts as a graphitization catalyst and causes a change in a structure of surrounding carbon. Following the mixing step, the mixture is graphitized at 2000 to 3100° C.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION OF THE INVENTION

A negative active material for a rechargeable lithium battery of the present invention includes a crystalline carbon core and a semi-crystalline carbon shell formed surrounding the core.

The semi-crystalline carbon shell includes at least one element (hereinafter referred to as a catalyst element) and carbides thereof (hereinafter referred to as metal carbide) or a compound of at least two different elements (hereinafter referred to as a catalyst element $M_1M_2M_3 \ldots M_n$ compound, where n is an integer). The compound consists of only at least one element.

The catalyst element includes one or more of a transition metal, an alkali metal, an alkali earth metal, a semi-metal of Group 3A of the Periodic table, a semi-metal of Group 3B, a semi-metal of Group 4A, a semi-metal of Group 4B, an element of Group 5A, an element of Group 5B, a lanthanide or an actinium. Preferably, the transition metal is selected from Mn, Ni, Fe, Cr, Co, Cu, Mo, W, Te, Re, Ru, Os, Rh, Ir, Pd or Pt; the alkali metal is selected from Li, Na or K; the alkali earth metal is selected from Be, Sr, Ba, Ca or Mg; the semi-metal of Group 3A is selected from Sc, Y, La or Ac; the semi-metal of Group 3B is selected from B, Al, or Ga; the semi-metal of Group 4A is selected from Ti, Zr or Hf; the semi-metal of Group 4B is selected from Si, Ge, or Sn; the element of Group 5A is selected from V, Nb, or Ta; the element of Group 5B is selected from P, Sb or Bi; the lanthanide is selected from Ce, Pr, Nd, Pm, Sm, Eu, Gd, Tb, Dy, Ho, Er, Tm, Yb or Lu; and the actinium is selected from Th, Pa, U, Np, Pu, Am, Cm, Bk, Cf, Es, Fm, Md, No or Lw.

An example of the catalyst element $M_1M_2M_3 \ldots M_n$ compound is $M_1M_2M_3 \ldots B$ compound, that is metal boride. The exemplary thereof includes $TiB_2$, $ZrB_2$, $DyB_2$, $HfB_2$, $HoB_2$, $LuB_2$, $ScB_2$, $Ni_2B$, $TaB_2$, $TmB_{12}$, $VB_2$, $W_2B_5$, $CrB_2$, calcium boride, lithium boride, and cobalt boride. The exemplary thereof includes titanium carbide, zirconium carbide, nickel carbide, silicon carbide, calcium carbide and boron carbide. The metal boride and the metal carbide are not limited to the above compounds.

The negative active material includes 0.001 to 20 wt % of the catalyst element. If the amount of the catalyst element is less than 0.001 wt %, the effect of increasing the graphitization degree of the active material is not induced. Whereas, if the amount of the catalyst element is more than 20 wt %, the excess catalyst element may be impurity and the movement of lithium ions may be prohibited. In the case where the negative active material utilizes the catalyst element $M_1M_2M_3 \ldots B$ compound, metal boride, it is clear that 0.01 to 20 wt % of the metal boride is present in the negative active material, because the metal boride consists of only the catalyst elements.

More preferably, the negative active material includes 0.0005 to 10 wt % of B and 0.0005 to 10 wt % of another element excluding B. The another element includes a transition metal; an alkali metal; an alkali earth metal; a semi-metal selected from Group 3A, 3B, 4A, and 4B; an element of 5A, and 5B; a lanthanide, and an actinium. The transition metal is selected from Mn, Ni, Fe, Cr, Co, Cu, Mo, W, Te, Re, Ru, Os, Rh, Ir, Pd or Pt. The alkali metal is selected from Li, Na, or K. The alkali earth metal is selected from Be, Sr, Ba, Ca or Mg. The semi-metal of Group 3A is selected from Sc, Y, La or Ac. The semi-metal of Group 3B is Al or Ga. The semi-metal of Group 4A is selected from Ti, Zr or Hf. The semi-metal of Group 4B is selected from Si, Ge, or Sn. The element of Group 5A is selected from V, Nb, or Ta. The element of Group 5B is selected from P, Sb, or Bi. The lanthanide is selected from Ce, Pr, Nd, Pm, Sm, Eu, Gd, Tb, Dy, Ho, Er, Tm, Yb, or Lu. The actinium is selected from Th, Pa, U, Np, Pu, Am, Cm, Bk, Cf, Es, Fm, Md, No or Lw.

Boron acts as an acceptor in the graphitization process such that electron transfer during initial lithium intercalation is accelerated. Furthermore, by including boron, the edge of the artificial graphite active material takes on a half onion-sheath structure, thereby enabling the use of propylene carbonate electrolyte and reducing irreversible capacity.

The catalyst element and the catalyst element $M_1M_2M_3 \ldots M_n$ compound act as a graphitization catalyst and cause a change in the structure surrounding carbon. Accordingly, the catalyst element and the catalyst element $M_1M_2M_3 \ldots M_n$ compound cause the conversion of an amorphous carbon precursor on a surface of the active material into a semi-crystalline carbon structure as well as the conversion of an amorphous carbon core into a crystalline structure. The semi-crystalline carbon structure is a skeletal, turbostratic, or half onion-sheath structure. Furthermore, the metal carbide helps the conversion of the amorphous precursor from an amorphous structure into a crystalline structure. In the semi-crystalline carbon shell, the catalyst element or the catalyst element $M_1M_2M_3 \ldots M_n$ compound, particularly metal boride nano particles, is uniformly distributed.

Figure 1A:
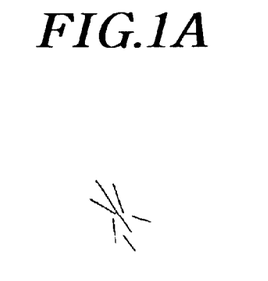
FIGS. 1a and 1b are schematic views showing surface structures of a negative active material of the present invention.
Figure 1B:
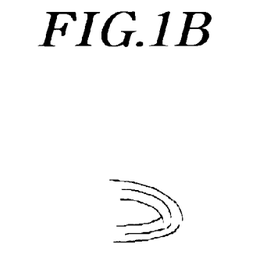
Figure 1C:
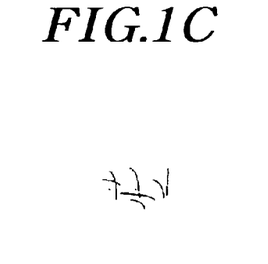
FIG. 1c is a schematic view showing a surface structure of amorphous carbon.

FIGS. 1a, 1b and 1c show a turbostratic structure, half onion-sheath structure, and an amorphous carbon structure, respectively. As shown in FIGS. 1a, 1b and 1c, the turbostratic and half onion-sheath structures are distinguished from the amorphous structure.

The negative active material preparation will be described in more detail. The two cases in which an amorphous carbon precursor is and is not used are described.

1) Without the use of amorphous carbon precursor

Amorphous carbon or crystalline carbon is mixed with catalyst elements or compounds thereof. The compounds are classified into an A-B compound and an A-C compound. A and B are each at least one element and C is not an element. In the mixing step, metal carbides may be further used. Hereinafter, the catalyst elements, the compounds and the metal carbide are referred to as addition materials.

The mixing step may be performed by adding a solid type or a liquid type addition material to amorphous carbon or crystalline carbon. In the case of the liquid type addition material, a solvent used may be water, an organic solvent or a mixture thereof. The organic solvent may be ethanol, isopropyl alcohol, toluene, benzene, hexane or tetrahydrofuran. The liquid type addition material preferably has a sufficient concentration to enable uniform mixing. If the concentration is excessively low, it is difficult to dry the solvent and to uniform mixing. On the other hand, if the concentration is too high, the compounds such as the catalyst element are agglomerated so that the reaction with carbon is not possible.

The mixing step by using the liquid type addition material may be performed by using mechanical apparatus to mix the addition material solution with amorphous carbon or crystalline carbon, or by spray-drying, spray-pyrolyzing, or freeze-drying the solution to the carbon. Examples of the mechanical apparatus include a kneading procedure with carbon and the addition material solution, a procedure in which a mixer having wings with a structure to apply a shear stress is used, and a mechanochemical procedure where shear stress is applied to particles to melt a surface of the particles.

If miniscule particles are used for the carbon core, a coating step is performed together with an agglomeration step. When the coating step and the agglomeration step are performed at the same time, a plurality of primary particles is agglomerated to form a mass. Hereinafter, the minuscule particles are referred to as "primary particles" and the agglomerated masses are referred to as "secondary particles". In the coating and agglomerating step, the amorphous carbon acts as a binder to induce the agglomeration of the primary particles. If spray-drying is performed, globular secondary particles may be produced. If the other coating methods are used, shapeless secondary particles may be produced.

In the mixing step, the weight ratio of amorphous carbon or crystalline carbon to the catalyst element is preferably 99.999 to 80: 0.001 to 20. If the catalyst element compounds or compounds including at least two elements are used, the weight ratio of amorphous carbon or crystalline carbon to the catalyst element in the compound is the same.

The catalyst element may be one or more of a transition metal; an alkali metal; an alkali earth metal; a semi-metal of Group 3A, Group 3B, Group 4A, and Group 4B; an element of Group 5A and 5B; a lanthanide; an actinium or a mixture thereof. Preferred are transition metals such as Mn, Ni, Fe, Cr, Co, Cu, Mo, W, Te, Re, Ru, Os, Rh, Ir, Pd or Pt; alkali metals such as Li, Na or K; alkali earth metals such as Be, Sr, Ba, Ca or Mg; semi-metals of Group 3A such as Sc, Y, La or Ac; semi-metals of Group 3B such as B, Al or Ga; semi-metals of Group 4A such as Ti, Zr or Hf; semi-metals of Group 4B such as Si, Ge or Sn; elements of Group 5A such as V, Nb or Ta; elements of Group 5B such as P, Sb, or Bi; lanthanide series such as Ce, Pr, Nd, Pm, Sm, Eu, Gd, Tb, Dy, Ho, Er, Tm, Yb or Lu; and actinium series such as Th, Pa, U, Np, Pu, Am, Cm, Bk, Cf, Es, Fm, Md, No or Lw. Examples of the compound include oxides, nitrides, carbides, sulfides, hydroxides and hydrides of the element and the exemplary are titanium-t-isopropoxide, nickel nitrate and $B_2O_3$. Also, examples of the compound having at least two elements include oxides, nitrides, carbides, sulfides, sulfides, hydroxides, and hydrides of at least two element-included compound and the exemplary are $Ca(BH_4)$, $LiBH_4$, $TiB_2$, $ZrB_2$, $DyB_2$, $HfB_2$, $HoB_2$, $LuB_2$, $ScB_2$, $Ni_2B$, $TaB_2$, $TmB_2$, $VB_2$, $W_2B_5$, $CrB_2$, calcium boride, lithium boride and cobalt boride.

The exemplary of the metal carbide includes titanium carbide, zirconium carbide, nickel carbide, silicon carbide, calcium carbide and boron carbide.

The carbon core may be a large single particle with a diameter of 1 to 75 $\mu$m or minuscule particles, that is primary particles with a diameter of 0.1 to 30 $\mu$m.

The amorphous carbon may be soft carbon or hard carbon. The soft carbon is produced by heat-treating coal tar pitch, petroleum pitch, tar, or heavy oil with a low molecular weight at about 1000° C. The hard carbon is produced by heat-treating phenol resin, naphthalene resin, polyvinylalcohol resin, urethane resin, polyimide resin, furan resin, cellulose resin, epoxy resin or polystyrene resin at about 1000° C. Furthermore, during the heat-treating step, a polymerization catalyst such as $Br_2$, $Cl_2$ or $I_2$ may be used. Alternatively, carbon raw material which is heat-treated at 350 to 400° C. to increase a softening point and yield, is heat-treated at about 1000° C. to obtain soft carbon or hard carbon. Alternatively, mesophase pitch prepared by heat-treating petroleum type carbon raw material, coal type carbon raw material or resin type raw material at 300 to 600° C.; mesophase pitch carbide prepared by heat-treating raw cokes and carbon raw material with or without performing an oxide stabilization process on the carbon raw material at 600 to 1500° C.; or fired cokes may be used.

The crystalline carbon may be shapeless, disk-shaped, flake, globular or fibrous natural graphite, artificial graphite or a mixture thereof.

Thereafter, the carbon core coated with the addition material is heat-treated at 2000 to 3200° C. under inert atmosphere or an air sealing atmosphere. As a result of heat-treating, only the catalyst elements remain. Accordingly, the crystalline carbon shell, which forms the surface of the active material includes only the catalyst elements. In addition, if two or more catalyst elements are used, the catalyst elements are bonded to generate catalyst element $M_1M_2M_3 \ldots M_n$ compounds on a surface of the crystalline carbon or amorphous carbon. The exemplary of the generated catalyst element $M_1M_2M_3 \ldots M_n$ compounds are $TiB_2$, $ZrB_2$, $DyB_2$, $HfB_2$, $HoB_2$, $LuB_2$, $ScB_2$, $Ni_2B$, $TaB_2$, $TmB_{12}$, $VB_2$, $W_2B_5$, $CrB_2$, calcium boride, lithium boride and cobalt boride.

Alternatively, if compounds including at least two catalyst elements are used, only the catalyst element $M_1M_2M_3 \ldots M_n$ compounds remain on the surface of the crystalline carbon or amorphous carbon. Furthermore, as described above, in the present invention, the catalyst element $M_1M_2M_3 \ldots M_n$ compounds, for example, $TiB_2$, $ZrB_2$, $DyB_2$, $HfB_2$, $HoB_2$, $LuB_2$, $ScB_2$, $Ni_2B$, $TaB_2$, $TmB_{12}$, $VB_2$, $W_2B_5$, $CrB_2$, calcium boride, lithium boride or cobalt boride, are directly mixed with the crystalline carbon or the amorphous carbon. Furthermore, the catalyst element may react with carbon to generate metal carbide on a surface of the crystalline carbon or the amorphous carbon even in the case where the metal carbide is not directly added to the active material.

The catalyst element or the catalyst element $M_1M_2M_3 \ldots M_n$ compound and metal carbide cause the formation of a skeletal structure on the surface of the crystalline carbon or the amorphous carbon and cause the conversion of the crystalline carbon or the amorphous carbon into a turbostratic structure or a half onion-sheath structure.

If the amorphous carbon is used for the core, the amorphous carbon is converted into crystalline carbon, and if the crystalline carbon is used for the core, the crystallinity of the core is increased. The turbostratic structure is characterized by a quasi-amorphous state and a more or less disordered orientation due to a radically low degree of crystallization and a minimal crystalline size. The catalyst element can cause the conversion of the amorphous carbon precursor on the surface of the active material into a semi-crystalline carbon structure and the amorphous carbon core into a crystalline structure.

Furthermore, since the addition materials may partly evaporate during the heat-treating step, the amount of the catalyst element on the surface of the active material may be reduced to less than an amount initially added.

2) With the use of amorphous carbon precursor

The preparation of the negative active material with the use of an amorphous carbon precursor will now be described. Areas where the method of preparation is identical to that where no precursor is used will be omitted.

Amorphous carbon or crystalline carbon is mixed with an addition material and an amorphous carbon precursor.

The mixing step may be performed by adding a solid type or a liquid type addition material to amorphous carbon or crystalline carbon. In the case of the liquid type addition material, a solvent used may be water, an organic solvent or a mixture thereof. The organic solvent may be ethanol, isopropyl alcohol, toluene, benzene, hexane or tetrahydrofuran.

In the mixing step, the weight ratio of the mixed weight of amorphous carbon or crystalline with the amorphous carbon precursor to the catalyst element is preferably 99.999 to 80: 0.001 to 20. If the catalyst element compounds or compounds including at least two elements are used, the weight ratio of amorphous carbon or crystalline carbon to the catalyst element in the compound is the same. The weight ratio may be varied according to the desired properties of the resulting material.

The amorphous carbon precursor may be a resin such as phenol resin, naphthalene resin, polyvinylalcohol resin, urethane resin, polyimide resin, furan resin, cellulose resin, epoxy resin, polystyrene resin, coal tar pitch, petroleum pitch, tar or heavy oil with a low molecular weight. Also, a mixture may be used. Among these materials, coal tar pitch and petroleum pitch are preferred because they exhibit high capacity and low irreversible capacity.

If mesophase pitch, which is sintered at a low temperature of 300 to 600° C. is used as the precursor during or after the mixing step, a carbonizing or calcinating step is preferably performed to evaporate volatile portions of the amorphous carbon precursor. If the volatile portions of the amorphous carbon precursor are evaporated, durability and cycle life in the resulting battery are improved.

Thereafter, the carbon core coated with the addition material and the amorphous carbon precursor are heat-treated at 2000 to 3200° C. under inert atmosphere or an air sealing atmosphere.

When the heat-treating step is performed at 2000 to 3200° C., the active material has an intensity ratio I(110)/I(002) of an X-ray diffraction peak intensity I(002) at a (002) plane to an X-ray diffraction peak intensity I(110) at a (110) plane of less than 0.04. As an intensity ratio of an X-ray diffraction decreases, capacity increases. Generally, natural graphite having high capacity has an intensity ratio I(110)/(002) of less than 0.04. It is shown that the negative active material of the present invention exhibits high capacity.

A Raman Spectroscopy intensity ratio I(1360)/I(1580) of the core is 0.3 or less and the corresponding intensity ratio of the carbon surface is 0.2 or more.

The negative active material includes 50 to 99.9 wt % of the crystalline carbon core and 0.1 to 50 wt % of the semi-crystalline carbon shell having turbostratic structure. If the carbon shell is less than 0.1 wt %, charge and discharge efficiency is reduced, whereas, if the carbon shell is more than 50 wt %, discharge capacity and voltage flatness deteriorate.

Figure 2:
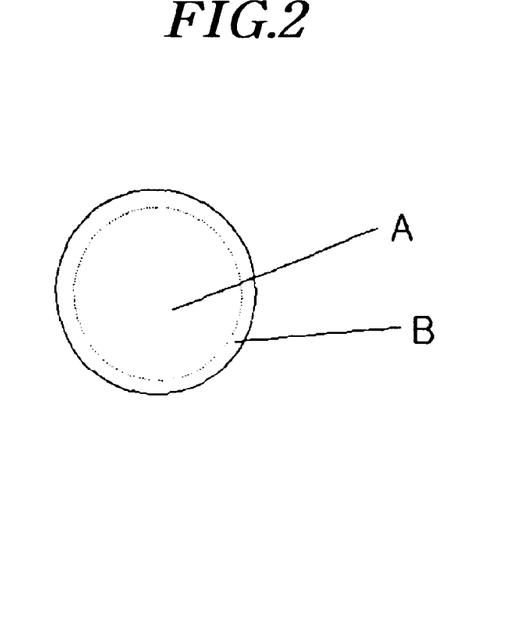
FIG. 2 is a sectional view showing a structure of the negative active material of one embodiment of the present invention.
Figure 3:
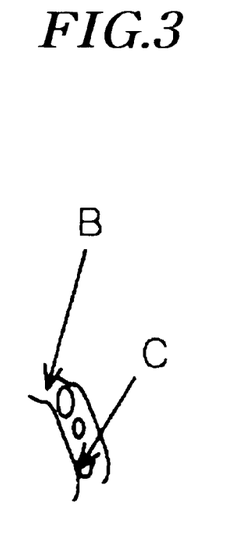
FIG. 3 is an enlarged diagram illustrating a surface of the negative active material of the present invention.
Figure 4:
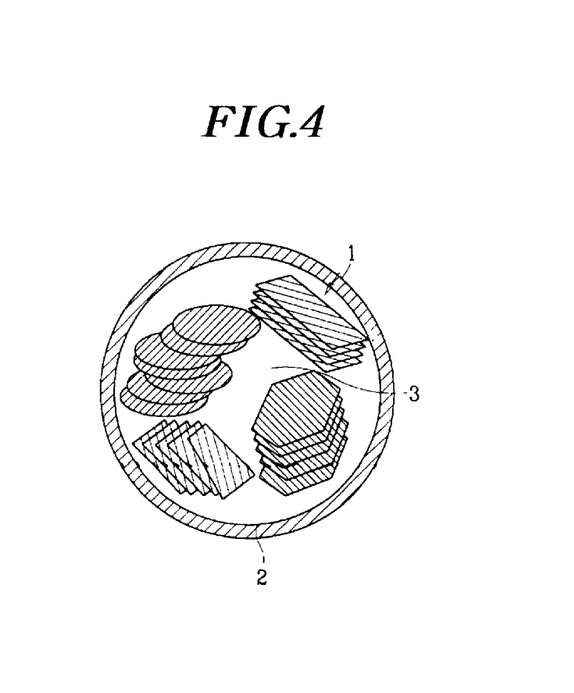
FIG. 4 is a sectional view showing a structure of the negative active material of another embodiment of the present invention.

As shown in FIG. 2, the negative active material of the present invention consists of the crystalline carbon core A and the semi-crystalline carbon shell B formed around the core. Furthermore, the catalyst element or the catalyst element $M_1M_2M_3 \ldots M_n$ compound and metal carbide C are uniformly distributed in the carbon shell as shown in FIG. 3. In addition, as shown in FIG. 4, if the primary particles are used as the carbon core, two or more carbon core primary particles 1 are agglomerated to form secondary particles and the semi-crystalline carbon shell 2 is formed on the secondary particles. Although packed rechargeable batteries are generally produced, it is possible for microporous channels 3 to form between the primary particles. The microporous channel may be formed between the primary particles. Owing to the microporous channels 3, the electrolyte is easily immersed into the negative active material of the present invention. Accordingly, the negative active material enables improved high-rate charge and discharge and cycle life characteristics in the battery to which it is applied.

The negative active material of the present invention has a surface turbostratic structure or a half onion-sheath structure which enables a reduction in a side reaction between the electrolyte and the active material, and increases a crystallinity of the core, resulting in a good discharge capacity.

The present invention is further explained in more detail with reference to the following examples.

EXAMPLE 1

500 g of soft carbon cokes powder as a graphite precursor were mixed with 10 g of titanium carbide and the resulting mixture was put into an agglomaster (Hosakawa Co.). 10 g of titanium-t-isopropoxide were distributed into water to prepare a titanium solution and 20 g of $B_2O_3$ were dissolved in water to prepare a boron solution. The titanium and boron solutions were sprayed into the agglomaster. As a result, tiny particles of titanium carbide, titanium-t-isopropoxide and $B_2O_3$ were adhered to a surface of the cokes powder.

The resulting material was heat-treated at 2800° C. to produce a negative active material for a rechargeable lithium battery. The negative active material included a carbon shell containing titanium carbide and titanium boride.

EXAMPLE 2

A negative active material for a rechargeable lithium battery was prepared by the same procedure in Example 1 except that 20 g of titanium carbide, 10 g of titanium-t-isopropoxide and 30 g of $B_2O_3$ were used. As a result, the negative active material included a carbon shell containing titanium carbide and titanium boride.

EXAMPLE 3

A negative active material for a rechargeable lithium battery was prepared by the same procedure in Example 1 except that 10 g of zirconium carbide, 10 g of titanium-t-isopropoxide and 30 g of $B_2O_3$ were used. As a result, the negative active material included a carbon shell containing zirconium carbide and titanium boride.

EXAMPLE 4

A negative active material for a rechargeable lithium battery was prepared by the same procedure in Example 1 except that 10 g of titanium carbide, 15 g of nickel nitrate and 30 g of $B_2O_3$ were used. As a result, the negative active material included a carbon shell containing titanium carbide and nickel boride.

EXAMPLE 5

A negative active material for a rechargeable lithium battery was prepared by the same procedure in Example 1 except that 20 g of titanium carbide, 15 g of nickel nitrate and 30 g of $B_2O_3$ were used. As a result, the negative active material included a carbon shell containing titanium carbide and nickel boride.

EXAMPLE 6

A negative active material for a rechargeable lithium battery was prepared by the same procedure in Example 1 except that 10 g of zirconium carbide, 15 g of nickel nitrate and 30 g of $B_2O_3$ were used. As a result, the negative active material included a carbon shell containing zirconium carbide and nickel boride.

EXAMPLE 7

A negative active material for a rechargeable lithium battery was prepared by the same procedure in Example 1 except that 300 g of cokes, 10 g of titanium carbide and 10 g of titanium boride powder were sprayed into an agglomaster. As a result, the negative active material included a carbon shell containing titanium carbide and titanium boride.

EXAMPLE 8

A negative active material for a rechargeable lithium battery was prepared by the same procedure in Example 1 except that 500 g of cokes, 20 g of zirconium carbide and 20 g of zirconium boride were sprayed into an agglomaster. As a result, the negative active material included a carbon shell containing zirconium carbide and zirconium boride.

EXAMPLE 9

A negative active material for a rechargeable lithium battery was prepared by the same procedure in Example 1 except that 500 g of cokes, 10 g of nickel carbide and 10 g of nickel boride were sprayed to an agglomaster. As a result, the negative active material included a carbon shell containing nickel carbide and nickel boride.

EXAMPLE 10

Pitch in toluene (net weight of pitch: 30 g) was added to an alcohol mixture solution. The alcohol mixture solution was prepared by mixing 10 g of titanium-t-isopropoxide in isopropyl alcohol and 20 g of $B_2O_3$ in ethyl alcohol. 20 g of titanium carbide were added to the mixed solution. The resulting mixture and 500 g of cokes were put into a mixer. As a result, the cokes were uniformly coated with titanium-t-isopropoxide, $B_2O_3$, titanium carbide and pitch.

Thereafter, the resulting cokes were heat-treated at 2800° C. to produce a negative active material for a rechargeable lithium battery. The negative active material included a carbon shell containing titanium carbide, and titanium boride.

EXAMPLE 11

Pitch was treated with toluene to remove insoluble components therefrom. 30 g of toluene-soluble pitch were dissolved in toluene to a pitch solution. The pitch solution was mixed with an alcohol mixture solution of titanium and boron. The alcohol mixture solution was prepared by mixing 5 g of titanium-t-isopropoxide in isopropyl alcohol and 10 g of $B_2O_3$ in ethyl alcohol. The mixed solution was mixed with 10 g of titanium carbide. The resulting mixture was heat-treated at 350° C. for 10 hours under an inert atmosphere and the heat-treated material was again heat-treated at 500° C. for 2 hours to obtain cokes. The cokes was pulverized and the pulverized material was carbonized at 1000° C. for 2 hours and the carbonized material was graphitized at 2800° C. for 1 hour to produce a negative active material for a rechargeable lithium battery. The negative active material included a carbon shell containing titanium carbide, and titanium boride.

Comparative Example 1

500 g of soft carbon cokes as a graphite precursor were heat-treated at 2800° C. under an inert atmosphere to prepare a negative active material for a rechargeable lithium battery.

Control 1

A negative active material for a rechargeable lithium battery was prepared by the same procedure in Example 1 except that titanium carbide was not used.

Control 2

A negative active material for a rechargeable lithium battery was prepared by the same procedure in Example 7 except that titanium carbide was not used.

Control 3

A negative active material for a rechargeable lithium battery was prepared by the same procedure in Example 10 except that titanium carbide was not used.

90 wt % of each of the carbonaceous materials according to Examples 1 to 11, Comparative example 1 and Controls 1 to 3 was mixed with 10 wt % of a polyvinylidene fluoride binder in a N-methyl pyrrolidone solvent to be thereby made into a slurry. The slurry was then coated on a collector made of copper foil and the coated collector was dried in an oven at 120° C. to thereby form a negative electrode plate. Next, a coin type cell was manufactured using the negative electrode plate together with a current electrode made of metallic lithium foil and an electrolyte of 1M $LiPF_6$ in an organic solvent of ethylene carbonate and dimethyl carbonate. The discharge capacity and charge and discharge efficiency during the first cycle of the cells were measured and the results are presented in Table 1. The discharge capacity was measured at both 1.5V and 0.25V of discharge voltage.

TABLE 1

|  | Discharge capacity during the first cycle [mAh/g] | | Charge and discharge efficiency during the first cycle | |
| --- | --- | --- | --- | --- |
|  | 1.5 V | 0.25 V | [%] | I(110)/I(002) |
| Example 1 | 345 | 322 | 94 | 0.013 |
| Example 2 | 350 | 318 | 94 | 0.010 |
| Example 3 | 342 | 315 | 95 | 0.011 |
| Example 4 | 330 | 315 | 93 | 0.023 |
| Example 5 | 336 | 317 | 93 | 0.019 |
| Example 6 | 340 | 320 | 94 | 0.018 |
| Example 7 | 343 | 325 | 95 | 0.010 |
| Example 8 | 342 | 318 | 93 | 0.011 |
| Example 9 | 348 | 317 | 93 | 0.010 |
| Example 10 | 348 | 325 | 94 | 0.009 |
| Example 11 | 341 | 322 | 95 | 0.015 |
| Comparative Example 1 | 280 | 260 | 85 | 0.020 |
| Control 1 | 348 | 315 | 93 | 0.012 |
| Control 2 | 351 | 320 | 92 | 0.009 |
| Control 3 | 348 | 315 | 94 | 0.011 |

As shown in Table 1, the cells with the active materials according to Examples 1 to 11 exhibited good discharge capacity and charge and discharge efficiency when compared with Comparative example 1. Furthermore, the negative active material according to Examples 1 to 11 showed higher current density and lower flatness voltage at 2.5V than Controls 1 to 3. It is believed that the graphitization catalyst in the negative active material according to Examples 1 to 11 makes to improve the reactivity between metal boride and carbon. In addition, the graphitization catalyst reduces resistance of a surface of the negative active material such that high-rate characteristics and cycle life characteristics are improved.

Figure 5:
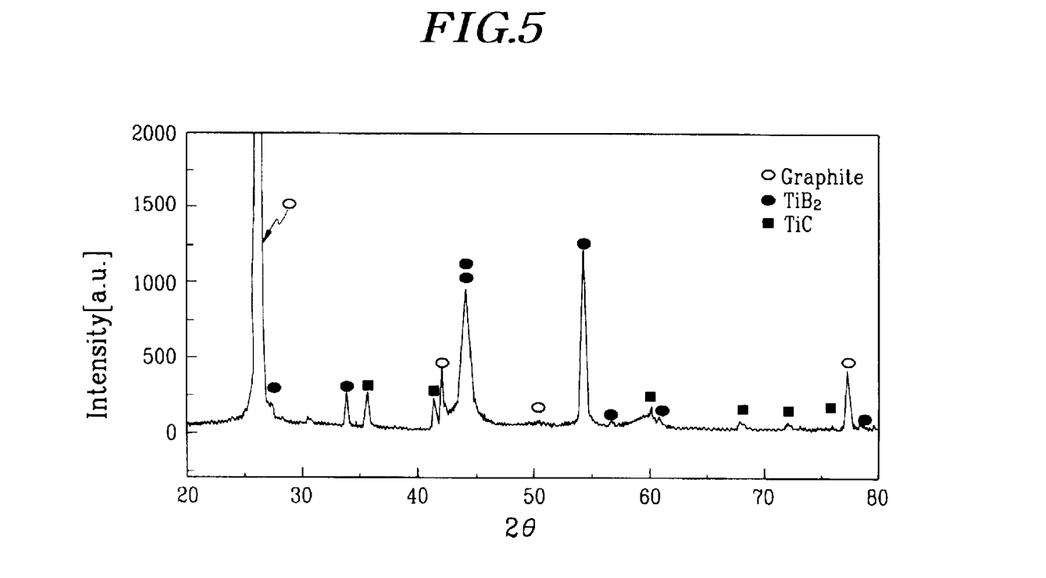
FIG. 5 is a graph illustrating an X-ray diffraction (XRD) pattern of the negative active material of the present invention.

FIG. 5 shows an XRD result of the negative active material according to Example 1 with titanium boride and titanium carbide. As shown in FIG. 5, it was confirmed that titanium boride and titanium carbide were produced in a surface of the negative active material.

The negative active material of the present invention has good high-rate characteristics and cycle life characteristics.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A negative active material for a rechargeable lithium battery comprising:
    a crystalline carbon core; and
    semi-crystalline carbon shell formed on the core, the semi-crystalline carbon shell including metal boride and metal carbide, and having a turbostratic or half onion-sheath, the metal boride and metal carbide serving as graphitization catalyst and changing a structure of surrounding carbon.

2. The negative active material of claim 1 wherein the weight of the element is 0.001 to 20 wt % of total active material.

3. The negative active material of claim 1 wherein the negative active material includes 0.0005 to 10 wt % of B and 0.0005 to 10 wt % of the element selected from the group consisting of transition metals, alkali metals, alkaline earth metals, semi-metals of Group 3A, semi-metals of Group 3B, semi-metals of Group 4A, semi-metals of Group 4B, elements of Group 5A, elements of Group 5B, lanthanides and actiniums, the transition metal being selected from the group consisting of Mn, Ni, Fe, Cr, Co, Cu, Mo, W, Te, Re, Ru, Os, Rh, Ir, Pd and Pt; the alkali metal being selected from the group consisting of Li, Na and K; the alkali earth metal being selected from the group consisting of Be, Sr, Ba, Ca and Mg; the semi-metal of Group 3A being selected from the group consisting of Sc, Y, La and Ac; the semi-metal of Group 3B being selected from the group consisting of Al and Ga, the semi-metal of Group 4A being selected from the group consisting of Ti, Zr and Hf; the semi-metal of Group 4B being selected from the group consisting of Si, Ge and Sn; the element of Group 5A being selected from the group consisting of V, Nb and Ta; the element of Group 5B being selected from the group consisting of P, Sb, and Bi; the lanthanide being selected from the group consisting of Ce, Pr, Nd, Pm, Sm, Eu, Gd, Tb, Dy, Ho, Er, Tm, Yb and Lu and the actinium being selected from the group consisting of Th, Pa, U, Np, Pu, Am, Cm, Bk, Cf, Es, Fm, Md, No and Lw.

4. The negative active material of claim 1 wherein the negative active material includes 50 to 99.9 wt % of the crystalline carbon core and 0.1 to 50 wt % of the carbon shell.

5. The negative active material of claim 1 wherein the negative active material has an intensity ratio $I(110)/I(002)$ of an X-ray diffraction peak intensity $I(002)$ at a (002) plane to an X-ray diffraction peak intensity $I(110)$ at a (110) plane of less than 0.04.

6. The negative active material of claim 1 wherein the metal boride includes B and the element selected from the group consisting of transition metals, alkali metals, alkali earth metals, semi-metals of Group 3A, semi-metals of Group 3B, semi-metals of Group 4A, semi-metals of Group 4B, element of Group 5A, element of Group 5B, lanthanides and actiniums, the transition metal being selected from the group consisting of Mn, Ni, Fe, Cr, Co, Cu, Mo, W, Te, Re, Ru, Os, Rh, Ir, Pd and Pt; the alkali metal being selected from the group consisting of Li, Na and K; the alkali earth metal being selected from the group consisting of Be, Sr, Ba, Ca and Mg; the semi-metal of Group 3A being selected from the group consisting of Sc, Y, La and Ac; the semi-metal of Group 3B being selected from the group consisting of Al and Ga; the semi-metal of Group 4A being selected from the group consisting of Ti, Zr and Hf; the semi-metal of Group 4B being selected from the group consisting of Si, Ge and Sn; the element of Group 5A being selected from the group consisting of V, Nb and Ta; the element of Group 5B being selected from the group consisting of P, Sb, and Bi; the lanthanide being selected from the group consisting of Ce, Pr, Nd, Pm, Sm, Eu, Gd, Tb, Dy, Ho, Er, Tm, Yb and Lu; and the actinium being selected from the group consisting of Th, Pa, U, Np, Pu, Am, Cm, Bk, Cf, Es, Fm, Md, No or Lw.

7. The negative active material of claim 1 wherein the metal carbide includes C and the element selected from the group consisting of transition metals, alkali metals, alkali earth metals, semi-metals of Group 3A, semi-metals of Group 3B, semi-metals of Group 4A, semi-metals of Group 4B, element of Group 5A, element of Group 5B, lanthanides and actiniums, the transition metal being selected from the group consisting of Mn, Ni, Fe, Cr, Co, Cu, Mo, W, Te, Re, Ru, Os, Rh, Ir, Pd and Pt; the alkali metal being selected from the group consisting of Li, Na and K; the alkali earth metal being selected from the group consisting of Be, Sr, Ba, Ca and Mg; the semi-metal of Group 3A being selected from the group consisting of Sc, Y, La and Ac; the semi-metal of Group 3B being selected from the group consisting of Al and Ga; the semi-metal of Group 4A being selected from the group consisting of Ti, Zr and Hf, the semi-metal of Group 4B being selected from the group consisting of Si, Ge and Sn; the element of Group 5A being selected from the group consisting of V, Nb and Ta; the element of Group 5B being selected from the group consisting of P, Sb, and Bi; the lanthanide being selected from the group consisting of Ce, Pr, Nd, Pm, Sm, Eu, Gd, Th, Dy, Ho, Er, Tm, Yb and Lu; and the actinium being selected from the group consisting of Th, Pa, U, Np, Pu, Am, Cm, Bk, Cf, Es, Fm, Md, No or Lw.

8. The negative active material of claim 1 wherein the metal boride is at least one compound selected from the group consisting of $TiB_2$, $ZrB_2$, $DyB_2$, $HfB_2$, $HoB_2$, $LuB_2$, $ScB_2$, $Ni_2B$, $TaB_2$, $TmB_{12}$, $VB_2$, $W_2B_5$, $CrB_2$, calcium boride, lithium boride and cobalt boride.

9. The negative active material of claim 1 wherein the metal carbide is at least one compound selected from the group consisting of titanium carbide, zirconium carbide, nickel carbide, silicon carbide, calcium carbide and boron carbide.

10. A method of preparing a negative active material for a rechargeable lithium battery comprising:
    mixing amorphous carbon or crystalline carbon with liquid type metal boride and metal carbide, the metal boride and metal carbide serving graphitization catalyst and changing a structure of surrounding carbon; and
    graphitizing the mixture at 2000 to 3200° C.

11. The method of claim 10 wherein the metal boride includes B and the element selected from the group consisting of transition metals, alkali metals, alkali earth metals, semi-metals of Group 3A, semi-metals of Group 3B, semi-metals of Group 4A, semi-metals of Group 4B, element of Group 5A, element of Group 5B, lanthanides and actiniums, the transition metal being selected from the group consisting of Mn, Ni, Fe, Cr, Co, Cu, Mo, W, Te, Re, Ru, Os, Rh, Ir, Pd and Pt; the alkali metal being selected from the group consisting of Li, Na and K; the alkali earth metal being selected from the group consisting of Be, Sr, Ba, Ca and Mg;

the semi-metal of Group 3A being selected from the group consisting of Sc, Y, La and Ac; the semi-metal of Group 3B being selected from the group consisting of Al and Ga; the semi-metal of Group 4A being selected from the group consisting of Ti, Zr and Hf; the semi-metal of Group 4B being selected from the group consisting of Si, Ge and Sn; the element of Group 5A being selected from the group consisting of V, Nb and Ta; the element of Group 5B being selected from the group consisting of P, Sb, and Bi; the lanthanide being selected from the group consisting of Ce, Pr, Nd, Pm, Sm, Eu, Gd, Tb, Dy, Ho, Er, Tm, Yb and Lu; and the actinium being selected from the group consisting of Th, Pa, U, Np, Pu, Am, Cm, Bk, Cf, Es, Fm, Md, No or Lw.

12. The method of claim 10 wherein the amorphous carbon or crystalline carbon is prepared by agglomerating at least one particle.

13. The method of claim 10 wherein the mixing step is performed by agglomerating and coating at substantially the same time.

14. The method of claim 10 wherein an amorphous carbon precursor is further added in the mixing step.

* * * * *